(12) United States Patent
Martinez

(10) Patent No.: US 12,090,530 B1
(45) Date of Patent: Sep. 17, 2024

(54) PILOT SYSTEM FOR FLUSHING AN AUTOMATIC MAINTENANCE VALVE

(71) Applicant: Nick Martinez, Aurora, CO (US)

(72) Inventor: Nick Martinez, Aurora, CO (US)

( * ) Notice: Subject to any disclaimer, the term of this patent is extended or adjusted under 35 U.S.C. 154(b) by 0 days.

(21) Appl. No.: 18/436,648

(22) Filed: Feb. 8, 2024

(51) Int. Cl.
*B08B 9/032* (2006.01)
*F16K 31/36* (2006.01)

(52) U.S. Cl.
CPC ............ *B08B 9/0322* (2013.01); *F16K 31/36* (2013.01); *B08B 2209/032* (2013.01)

(58) Field of Classification Search
None
See application file for complete search history.

(56) References Cited

U.S. PATENT DOCUMENTS

| 2015/0114491 A1* | 4/2015 | Oksanen | G05D 7/03 137/487 |
| 2018/0221696 A1* | 8/2018 | McHugh, IV | A62C 35/68 |

* cited by examiner

*Primary Examiner* — Natasha N Campbell
*Assistant Examiner* — Pradhuman Parihar
(74) *Attorney, Agent, or Firm* — Ruben Alcoba, Esq.

(57) ABSTRACT

An improved pilot system that allows an automatic maintenance valve to be flushed of buildup. The improved pilot system is used to flush the three chambers of an automatic control valve. The pilot system comprises of lines, ball valves, a strainer, a restrainer plug, a flow stabilizer, a flow restrictor, a pressure reducing pilot, and a couple of isolating valves.

1 Claim, 1 Drawing Sheet

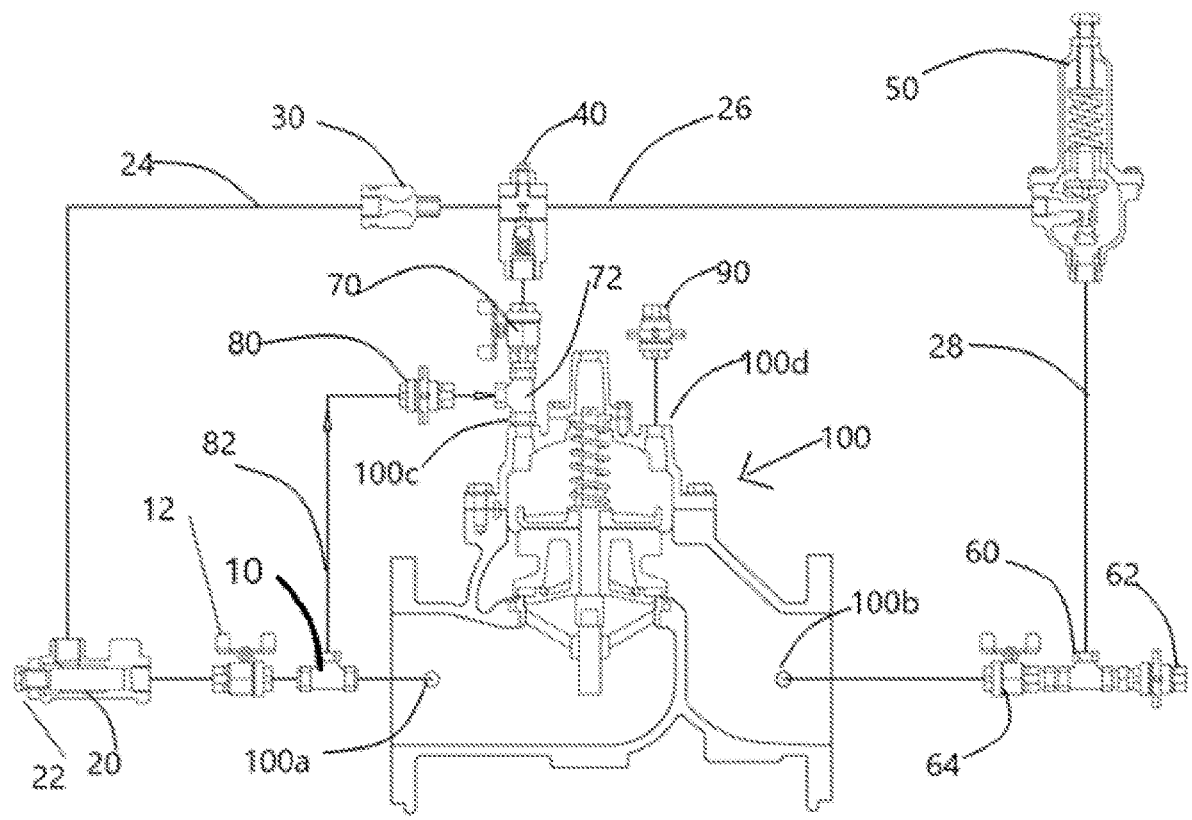

PILOT SYSTEM FOR FLUSHING AN AUTOMATIC MAINTENANCE VALVE

TECHNICAL FIELD

The present invention pertains to an improved pilot system that allows an automatic maintenance valve to be flushed of buildup.

BACKGROUND

The present invention is designed to extend the functionality of automatic control valves that are used in water systems.

Typically, automatic control valves use pilot systems to control the flow of fluid through the water systems.

The pilot systems control the optimum flow of fluid that flows through the automatic control valves that feed the water system.

The present invention is an improved pilot system that can be used to flush the cavities within an automatic control valve.

The improved pilot system allows maintenance workers that monitor the automatic control valves to flush the cavities of an automatic control valves.

The importance of flushing the cavities is that build up accumulates in the threads of the automatic control valves. The buildup in the threads leads to the clogging of the ports of the automatic control valves. Clogging in turn restricts the water that flows through each port, for clogging prevents the automatic control valves from working properly.

Automatic control valves are a crucial water component in water systems, and they have to operate at an optimum level to work correctly. The failure of the automatic control valves can lead to the following: 1. a failed open valve condition that can lead to high pressure in the water lines that can lead to main breaks in the water system; or 2. a failed closed valve condition that can lead to a zero-pressure condition that may result in back siphonage and cross contamination of the water in the water system.

The present invention addresses the need of having an improved pilot system that will allow the cavities of an automatic control valve to be flushed of buildup, thereby extending the life of the automatic control valve and that can also prevent the problems associated with a failed open valve condition or a failed open valve condition in the automatic control valve.

SUMMARY

The present invention is directed to an improved pilot system that allows the cavities of an automatic control valve to be flushed of buildup, thereby extending the life of the automatic control valve, and preventing the problems associated with a failed open valve condition or a failed closed valve condition in the automatic control valve.

The improved pilot system comprises of a first t-fitting that connects to an inlet port of an automatic control valve. A first ball valve that connects to the first t-fitting. A strainer that connects to the first ball valve, the strainer has a restrainer plug, the restrainer plug is used to release buildup into the environment. A first line that connects to the strainer. A flow restrictor that connects to the first line. A flow stabilizer that connects to the flow restrictor. A second line that connects the flow stabilizer to a pressure reducing pilot. A third line that connects to the pressure reducing pilot. A second t-fitting that connects to the third line. A second ball valve that connects to the second t-fitting that is used to release buildup into the environment. A first isolating valve that connects to the second t-fitting and to an outlet valve of the automatic control valve. A second isolating valve that connects to the flow stabilizer. A third t-fitting that connects to the isolating valve and to an upper inlet port of the automatic control valve. A third ball valve that connects to the third t-fitting. A fourth line that connects the second ball valve to the first t-fitting, and a fourth ball valve that connects to an upper outlet port of the automatic control valve.

An object of the present invention is to provide an improved pilot system that will extend the life of an automatic control valve.

Another object of the present invention is to provide an improved pilot system that will allow a maintenance worker the ability to flush the cavities of an automatic control valve.

A further object of the present invention is to provide an improved pilot system that will prevent a failed open valve condition in an automatic control valve that can lead to high pressure in the water lines of a water system that can lead to main breaks.

Yet a further object of the present invention is to provide an improved pilot system that will prevent a failed closed valve condition in an automatic control valve that can lead to a zero-pressure condition that may result in back siphonage and cross examination of the water in the water system.

BRIEF DESCRIPTION OF THE DRAWINGS

These and other features, aspects, and advantages of the present invention will become better understood with regards to the following description, appended claims, and drawings where:

FIG. 1 is a diagram of the present invention.

DESCRIPTION

As seen in FIG. 1, the present invention is an improved pilot system that allows an automatic maintenance valve to be flushed of buildup.

The improved pilot system comprises of a first t-fitting 10 that connects to an inlet port 100a of an automatic control valve 100. A first ball valve 12 that connects to the first t-fitting 10. A strainer 20 that connects to the first ball valve 12, the strainer 20 has a restrainer plug 22, the restrainer plug 22 is used to release buildup into the environment. A first line 24 that connects to the strainer 22. A flow restrictor 30 that connects to the first line 24. A flow stabilizer 40 that connects to the flow restrictor 30. A second line 26 that connects the flow stabilizer 40 to a pressure reducing pilot 50. A third line 28 that connects to the pressure reducing pilot 50. A second t-fitting 60 that connects to the third line 28. A second ball valve 62 that connects to the second t-fitting 60 that is used to release buildup into the environment. A first isolating valve 64 that connects to the second t-fitting 60 and to an outlet valve 100b of the automatic control valve 100. A second isolating valve 70 that connects to the flow stabilizer 40. A third t-fitting 72 that connects to the second isolating valve 70 and to an upper inlet port 100c of the automatic control valve 100. A third ball valve 80 that connects to the third t-fitting 72. A fourth line 82 that connects the third ball valve 80 to the first t-fitting 10. And a fourth ball valve 90 that connects to an upper outlet port 100d of the automatic control valve 100.

The improved pilot system of the present invention, after it is attached to an automatic control valve, is used as follows: first, closing the first ball valve 12, the first isolating valve 64, and the second isolating valve 70; second, removing the restrainer plug 22 on the strainer 20, using the first ball valve 12 as a source of fluid flow; third, flushing the fluid flow until the fluid is clear and the pressure is high as a discharge; fourth, securing the restrainer plug 22 onto the strainer 20; fifth, opening the second ball valve 62 and the first isolating valve 64, the first isolating valve 64 is the source of fluid flow; sixth, flushing until the fluid is clear and the pressure is high as a discharge; seventh, closing the second ball valve 62 and the first isolating valve 64; eight, opening the third ball valve 80 thereby inducing a high pressure source into the automatic control valve 100; ninth, opening the fourth ball valve 90 to flush the high pressure water and flushing until the water is clear and the pressure is high as a discharge; tenth, closing the fourth ball valve 90, note, it is essential to close the third ball valve 80 after closing the fourth ball valve 90, for the third ball valve 90 is to normally stay in a closed position; and Lastly, re-opening the first ball valve 12, the second ball valve 62, and the first isolating valve 64 and ensuring that a downstream pressure is at a set point.

An advantage of the present invention is that it provides an improved pilot system that extends the life of an automatic control valve.

Another advantage of the present invention is that it provides an improved pilot system that allows a maintenance worker the ability to flush the cavities of an automatic control valve.

A further advantage of the present invention is that it provides an improved pilot system that prevents a failed open valve condition in an automatic control valve that can lead to high pressure in the water lines of a water system that can lead to main breaks.

Yet a further advantage of the present invention is that it provides an improved pilot system that prevents a failed closed valve condition in an automatic control valve that can lead to a zero-pressure condition that may result in back siphonage and cross contamination of the water in the water system.

The embodiments of the improved pilot system described herein are exemplary and numerous modifications, combinations, variations, and rearrangements can be readily envisioned to achieve an equivalent result, all of which are intended to be embraced within the scope of the appended claims. Further, nothing in the above-provided discussions of the improved pilot system should be construed as limiting the invention to an embodiment or a combination of embodiments. The scope of the invention is defined by the description, drawings, and claims.

What is claimed is:

1. An improved pilot system that allows an automatic control valve to be flushed of buildup, the improved pilot system consists of: a first t-fitting that connects to an inlet port of an automatic control valve; a first ball valve that connects to the first t-fitting; a strainer that connects to the first ball valve, the strainer has a restrainer plug, the restrainer plug is used to release buildup into the environment; a first line that connects to the strainer; a flow restrictor that connects to the first line; a flow stabilizer that connects to the flow restrictor; a second line that connects the flow stabilizer to a pressure reducing pilot; a third line that connects to the pressure reducing pilot; a second t-fitting that connects to the third line; a second ball valve that connects to the second t-fitting that is used to release buildup into the environment; an isolating valve that connects to the second t-fitting and to an outlet valve of the automatic control valve; an isolating valve that connects to the flow stabilizer; a third t-fitting that connects to the isolating valve and to an upper inlet port of the automatic control valve; a third ball valve that connects to the third t-fitting; a fourth line that connects the second ball valve to the first t-fitting; and a fourth ball valve that connects to an upper outlet port of the automatic control valve.

* * * * *